United States Patent
Rado

(10) Patent No.: US 10,352,502 B2
(45) Date of Patent: Jul. 16, 2019

(54) SYSTEM AND METHOD FOR AUTOMATICALLY FILLING FLUID CYLINDERS

(71) Applicant: Scott Technologies, Inc., Boca Raton, FL (US)

(72) Inventor: Gordon E. Rado, Waxhaw, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 303 days.

(21) Appl. No.: 15/516,768

(22) PCT Filed: Oct. 6, 2015

(86) PCT No.: PCT/US2015/054175
§ 371 (c)(1),
(2) Date: Apr. 4, 2017

(87) PCT Pub. No.: WO2016/057475
PCT Pub. Date: Apr. 14, 2016

(65) Prior Publication Data
US 2017/0307140 A1    Oct. 26, 2017

Related U.S. Application Data

(60) Provisional application No. 62/060,161, filed on Oct. 6, 2014.

(51) Int. Cl.
F17C 5/06 (2006.01)
F17C 13/00 (2006.01)
G05D 16/20 (2006.01)

(52) U.S. Cl.
CPC ............ *F17C 5/06* (2013.01); *F17C 13/003* (2013.01); *G05D 16/2033* (2013.01);
(Continued)

(58) Field of Classification Search
CPC .... F17C 5/06; F17C 13/003; F17C 2270/025; F17C 2225/0123; F17C 2225/036;
(Continued)

(56) References Cited

U.S. PATENT DOCUMENTS 6,257,360 B1 * 7/2001 Wozniak .............. B60K 15/013
180/69.5
2011/0061742 A1 3/2011 Osteen et al.

FOREIGN PATENT DOCUMENTS

CN      2859180 Y    1/2007
CN    101726270 A    6/2010
(Continued)

OTHER PUBLICATIONS

Chinese Office Action dated Sep. 28, 2018 issued in corresponding Chinese Patent Application No. 201580056125.9, consisting of 11 pages.
(Continued)

*Primary Examiner* — Jason K Niesz
(74) *Attorney, Agent, or Firm* — Christopher & Weisberg, P.A.

(57) ABSTRACT

A cylinder filling system is configured to automatically fill fluid cylinders with fluid at varying fluid pressures. The cylinder filling system may include a plurality of pressure control manifolds operatively connected together and disposed in a fluid circuit between a fluid storage container and a fluid outlet. A control unit may be in communication with the plurality of pressure control manifolds. The control unit is configured to operate the plurality of pressure control manifolds to deliver fluid at a rated fluid pressure of a fluid cylinder that connects to the fluid outlet.

20 Claims, 11 Drawing Sheets

(52) U.S. Cl.
CPC ..... *G05D 16/2093* (2013.01); *G05D 16/2097*
(2019.01); *F17C 2205/0338* (2013.01); *F17C
2205/0382* (2013.01); *F17C 2205/0388*
(2013.01); *F17C 2221/031* (2013.01); *F17C
2223/0123* (2013.01); *F17C 2223/036*
(2013.01); *F17C 2225/0123* (2013.01); *F17C
2225/036* (2013.01); *F17C 2270/025*
(2013.01); *F17C 2270/0781* (2013.01)

(58) Field of Classification Search
CPC ........ F17C 2223/0123; F17C 2221/031; F17C
2205/0388; F17C 2205/0382; F17C
2205/0338; F17C 2270/0781; F17C
2223/036; G05D 16/2097; G05D 16/2033
See application file for complete search history.

(56) References Cited

FOREIGN PATENT DOCUMENTS

| | | |
|---|---|---|
| CN | 203425815 U | 2/2014 |
| WO | 2012/021953 A1 | 2/2012 |
| WO | 2014/152197 A1 | 9/2014 |

OTHER PUBLICATIONS

International Search Report and Written Opinion for PCT Application PCT/US2015/054175, dated Jan. 28, 2016, consisting of 5 pages.

\* cited by examiner

SYSTEM AND METHOD FOR AUTOMATICALLY FILLING FLUID CYLINDERS

CROSS-REFERENCE TO RELATED APPLICATIONS

This Application is a Submission Under 35 U.S.C. § 371 for U.S. National Stage Patent Application of International Application Number: PCT/US2015/054175, filed Oct. 6, 2015 entitled "SYSTEM AND METHOD FOR AUTOMATICALLY FILLING FLUID CYLINDERS," which claims priority to U.S. Provisional Application No. 62/060,161, filed Oct. 6, 2014, entitled "SYSTEM AND METHOD FOR AUTOMATICALLY FILLING FLUID CYLINDERS," the entirety of both which are incorporated herein by reference.

FIELD OF THE DISCLOSURE

Embodiments of the present disclosure generally relate to systems and methods for filling fluid containers, such as pressurized fluid cylinders, tanks, and the like. More specifically, fully automated filling systems.

BACKGROUND OF THE DISCLOSURE

Pressurized fluid cylinders are used in various settings. For example, a self-contained breathing apparatus (SCBA) typically includes an air cylinder that is used to provide safe, clean air to an individual for breathing. An SCBA is configured to be worn by individuals, such as rescue workers, firefighters, and others, to provide breathable air in a hazardous or otherwise unsafe atmosphere. When configured for use underwater, an SCBA is typically referred to as a self-contained underwater breathing apparatus (SCUBA).

An SCBA typically includes a high-pressure tank (for example, 4,500 psi) that connects to a pressure regulator, which in turn connects an inhalation connection, such as a mouthpiece, mouth mask, or face mask. At least one of the tank, regulator, and inhalation connection may be secured to a carrying frame that allows an individual to carry the SCBA on his/her back, for example. After use, a fluid tank or cylinder needs to be re-filled for future use.

Various breathing air cylinders, such as SCBA and SCUBA, may be configured for a variety of filling pressures. For example, pressures such as 5500 psi, 4500 psi, 3000 psi, and 2216 psi. Known charge stations that are configured to refill breathing air cylinders may include a manual selector valve that allows an individual to choose a particular pressure. Many known charge stations only provide a choice of two pressures and are plumbed with numerous fittings and tubes. As such, known charge stations require significant training and experience in the part of the operator in order to correctly fill fluid cylinders that are configured to be filled to different pressures.

Further, known charge stations are typically unable to prevent an individual from filling a fluid cylinder to an incorrect pressure. For example, an individual may inadvertently and/or unknowingly fill a 4500 psi fluid cylinder to only 3500 psi, or over fill it to 5500 psi.

A known charge station includes parallel pressure regulators and pressure relief valves controlled by a manual selector valve. Such a system depends on an individual to select the correct pressure for a particular breathing air cylinder being filled. Another known charge station includes a single regulator that an individual adjusts for each pressure requirement. In either case, it is possible for the individual to improperly adjust the pressure setting. Further, the individual may set a pressure relief valve too high to protect the breathing air cylinders at the lower settings.

SUMMARY OF THE DISCLOSURE

Embodiments of the present disclosure provide a cylinder filling system configured with multiple, selectable preset pressure regulators and corresponding relief valves that can be electrically activated by a control system to automatically fill fluid cylinders to the rated fluid pressures. The cylinder filling system may include a plurality of pressure control manifolds (or modules) operatively connected together in series and disposed in a fluid circuit between a fluid storage container and a fluid outlet. A control unit may be in communication with the pressure control manifolds. The control unit is configured to operate the pressure control manifolds to deliver fluid at a rated fluid pressure of a fluid cylinder that connects to the fluid outlet.

In at least one embodiment, the control unit is configured to recognize the fluid cylinder connected to the fluid outlet and operate the plurality of pressure control manifolds to deliver fluid at the rated fluid pressure.

Each of the plurality of pressure control manifolds may include a solenoid valve in operative communication with the control unit, a pilot operated valve controlled by the solenoid valve, a pressure regulator, a check valve, and a pressure relief valve.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an automatic charge or cylinder-refilling station system in which the correct fill pressure is selected without user intervention. Embodiments of the present disclosure accommodate a variety of required fill pressures and eliminate, minimize, or otherwise reduce many of the fittings and tubes as found on previous charge stations. Embodiments of the present disclosure provide systems and methods for automatically refilling a fluid cylinder that avoids inadvertent filling of a fluid cylinder to an incorrect pressure.

Figure 1:
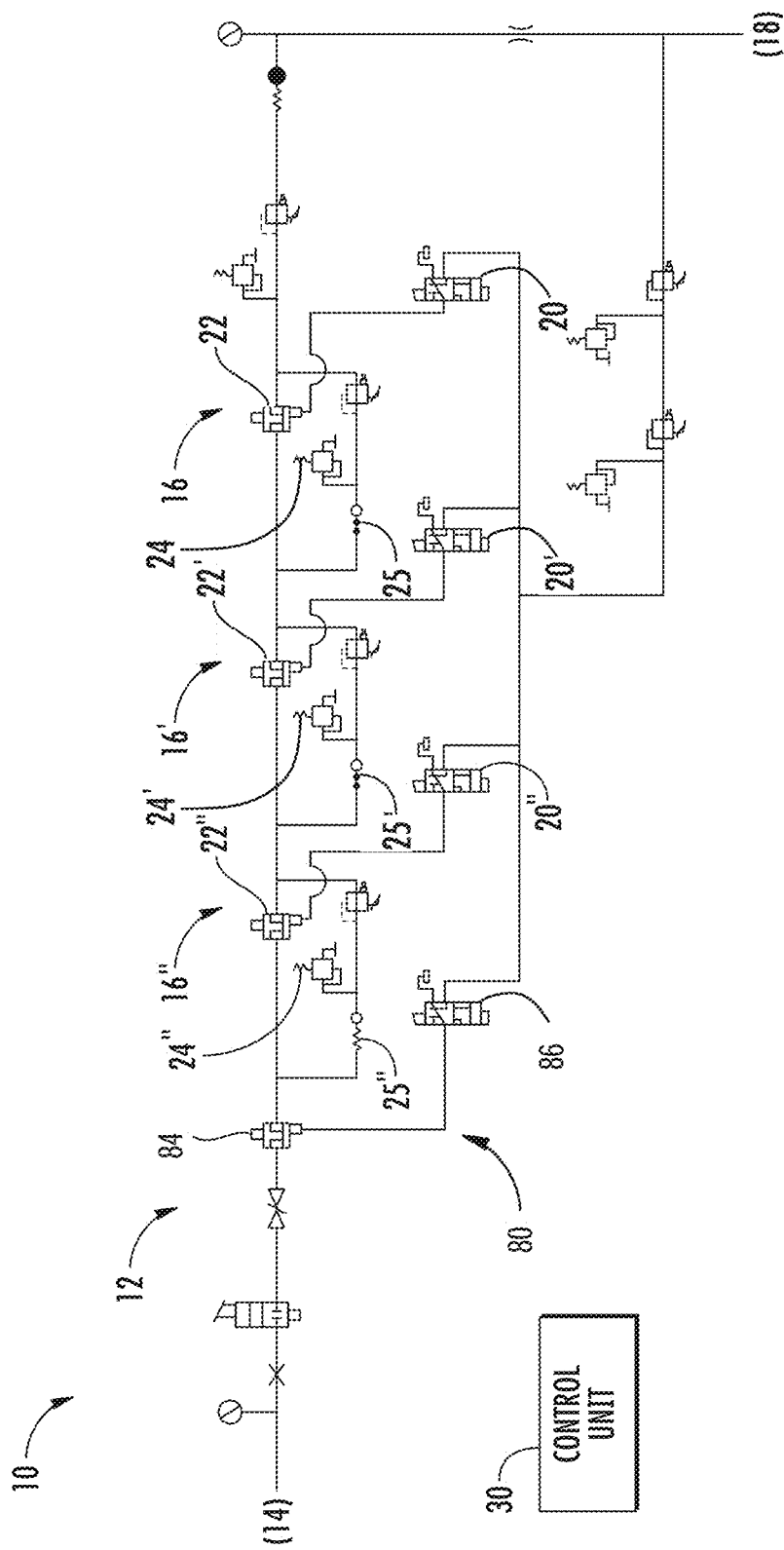
FIG. 1 illustrates a schematic diagram of a cylinder filling system, according to an embodiment of the present disclosure.

FIG. 1 illustrates a schematic diagram of a cylinder filling system 10, according to an embodiment of the present disclosure. The system 10 may include a fluid delivery circuit 12 that includes an outlet 14 configured to removably connect to a neck and/or nozzle of a fluid cylinder. The fluid delivery circuit 12 may include a plurality of pressure control manifolds 16 that are each configured to be operated to deliver fluid up to a particular pressure. As shown, the system 10 may include three modular pressure control manifolds 16, 16', 16", each of which is configured to be operated to deliver fluid up to a different pressure. The fluid delivery circuit 12 also includes an inlet 18 that is configured to connect to a fluid storage container. Each pressure control manifold 16, 16', 16" may include a solenoid valve 20, 20', 20", a pilot operated valve 22, 22' 22", a check valve 25, 25', 25", and a pressure relief valve 24, 24', 24". FIG. 1 also shows an outlet block 80.

The components of the system 10, including the pressure control manifolds 12, may be operatively connected to a control unit 30, which may be operatively connected and in communication with the components through wired or wireless connections. The control unit 30 may be configured to control operation of the system 10 in order to automatically fill fluid cylinders.

Various embodiments described herein provide a tangible and non-transitory (for example, not an electric signal) machine-readable medium or media having instructions recorded thereon for the control unit 30, which may be or include a processor or computer, to operate the system 10 to perform one or more embodiments of methods described herein. The medium or media may be any type of CD-ROM, DVD, floppy disk, hard disk, optical disk, flash RAM drive, or other type of computer-readable medium or a combination thereof.

The various embodiments and/or components, for example, the control units, modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor may also include a storage device, which may be a hard disk drive or a removable storage drive such as a floppy disk drive, optical disk drive, and the like. The storage device may also be other similar means for loading computer programs or other instructions into the computer or processor.

As used herein, the term "computer," "control unit," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
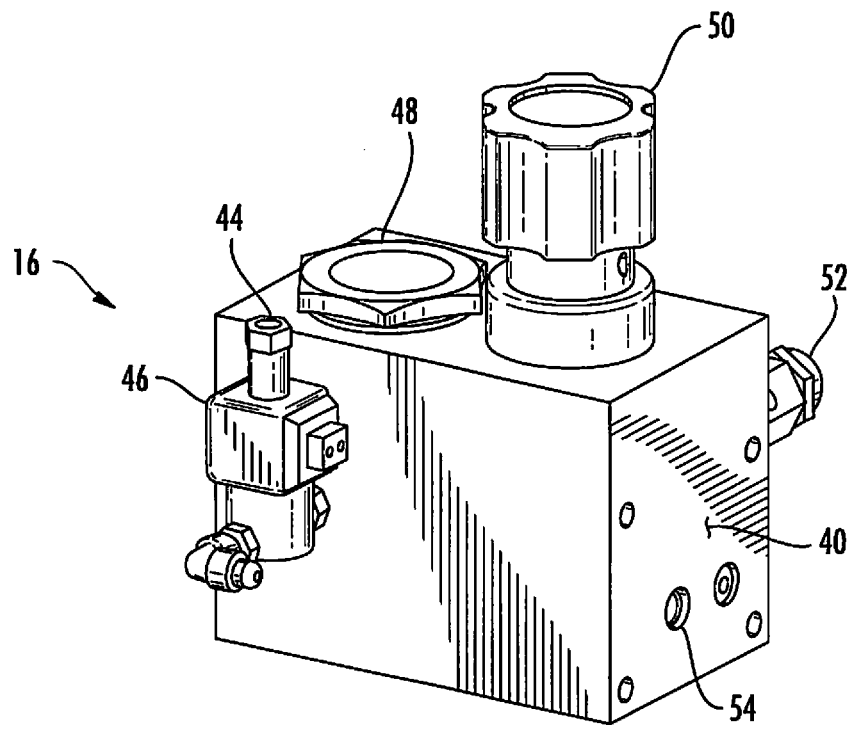
FIG. 2 illustrates a perspective view from a first side of a pressure control manifold, according to an embodiment of the present disclosure.
Figure 3:
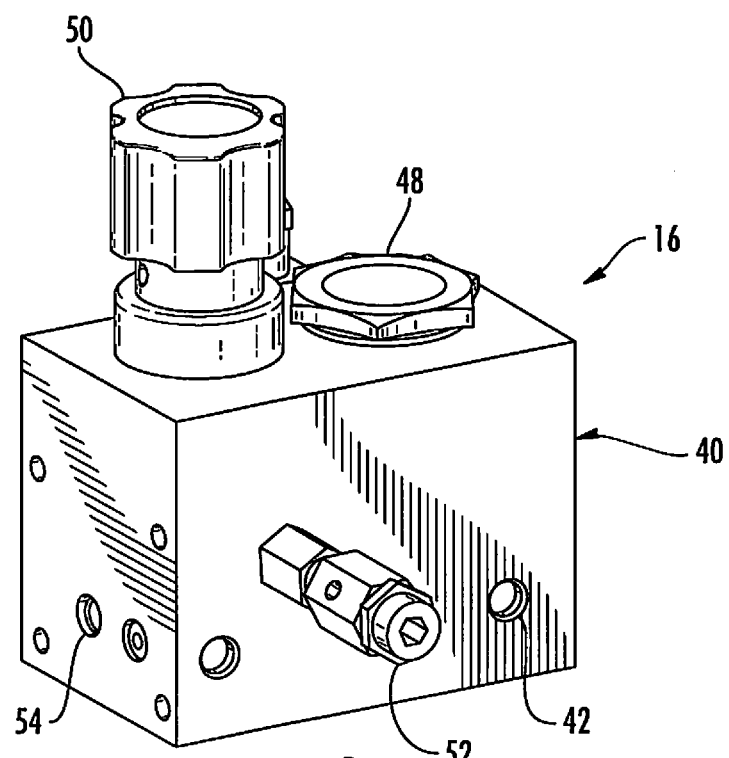
FIG. 3 illustrates a perspective view from a second side of a pressure control manifold, according to an embodiment of the present disclosure.

FIGS. 2 and 3 illustrate perspective views from first and second sides, respectively, of a pressure control manifold 16, according to an embodiment of the present disclosure. Referring to FIGS. 2 and 3, each pressure control manifold 16 may include a housing 40 that contains and/or supports an air inlet 42, a vent 44, a solenoid valve 46, a pilot operated valve 48, an adjustable pressure regulator 50, a pressure relief valve 52, and an outlet port 54.

Figure 4:
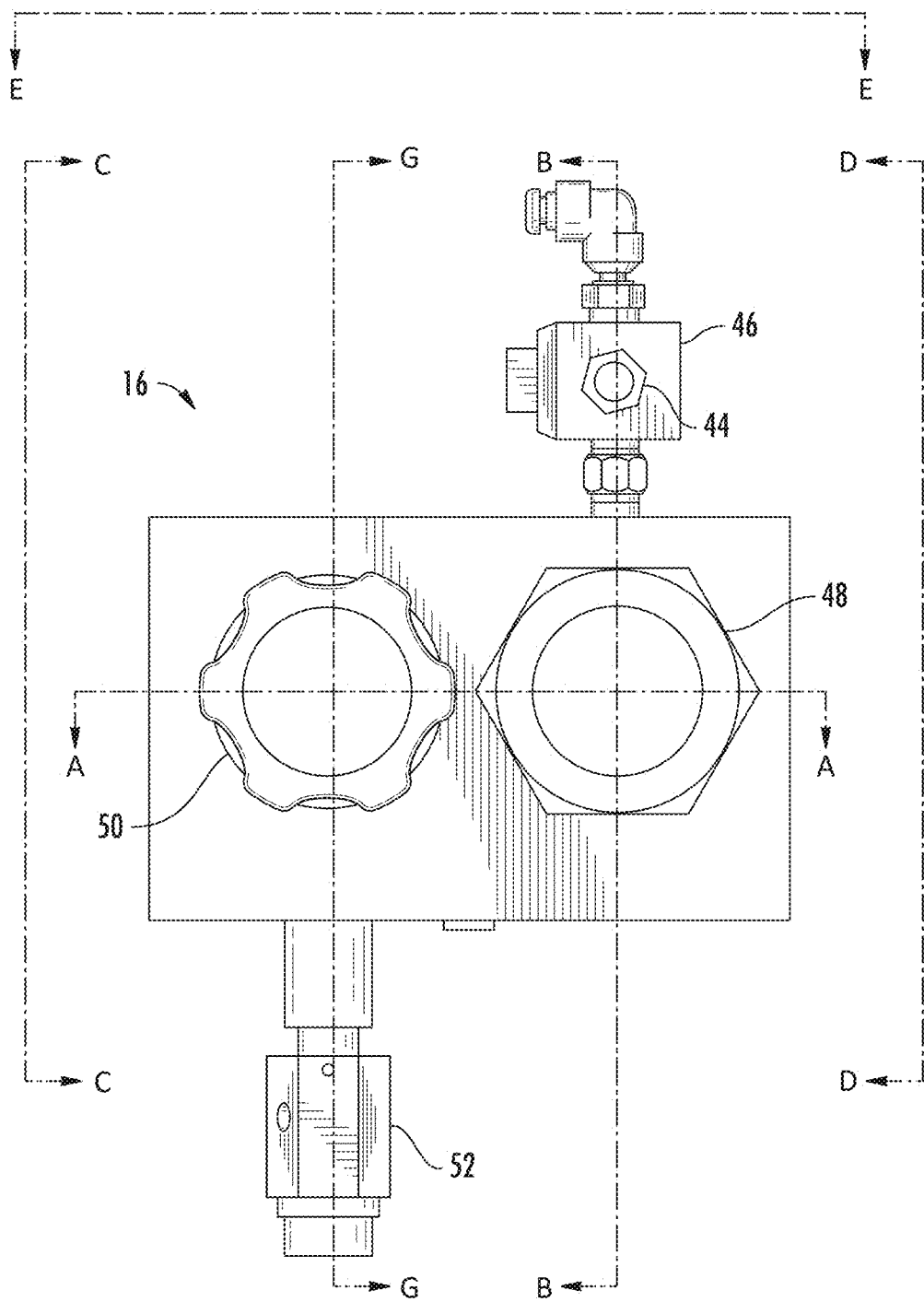
FIG. 4 illustrates a top plan view of a pressure control manifold, according to an embodiment of the present disclosure.
Figure 5:
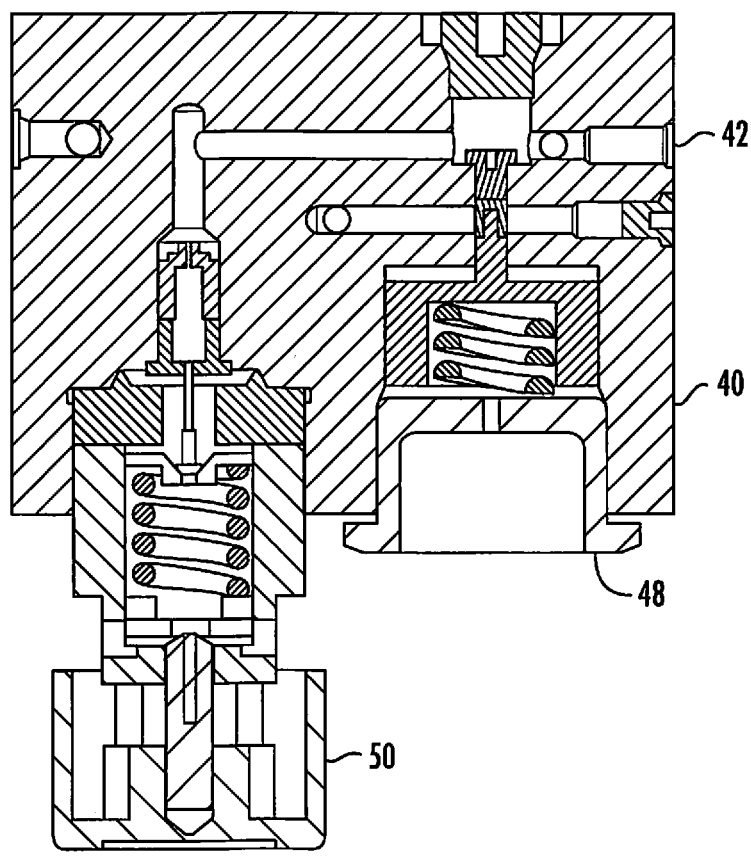
FIG. 5 illustrates a cross-sectional view of a pressure control manifold through line A-A of FIG. 4, according to an embodiment of the present disclosure.
Figure 6:
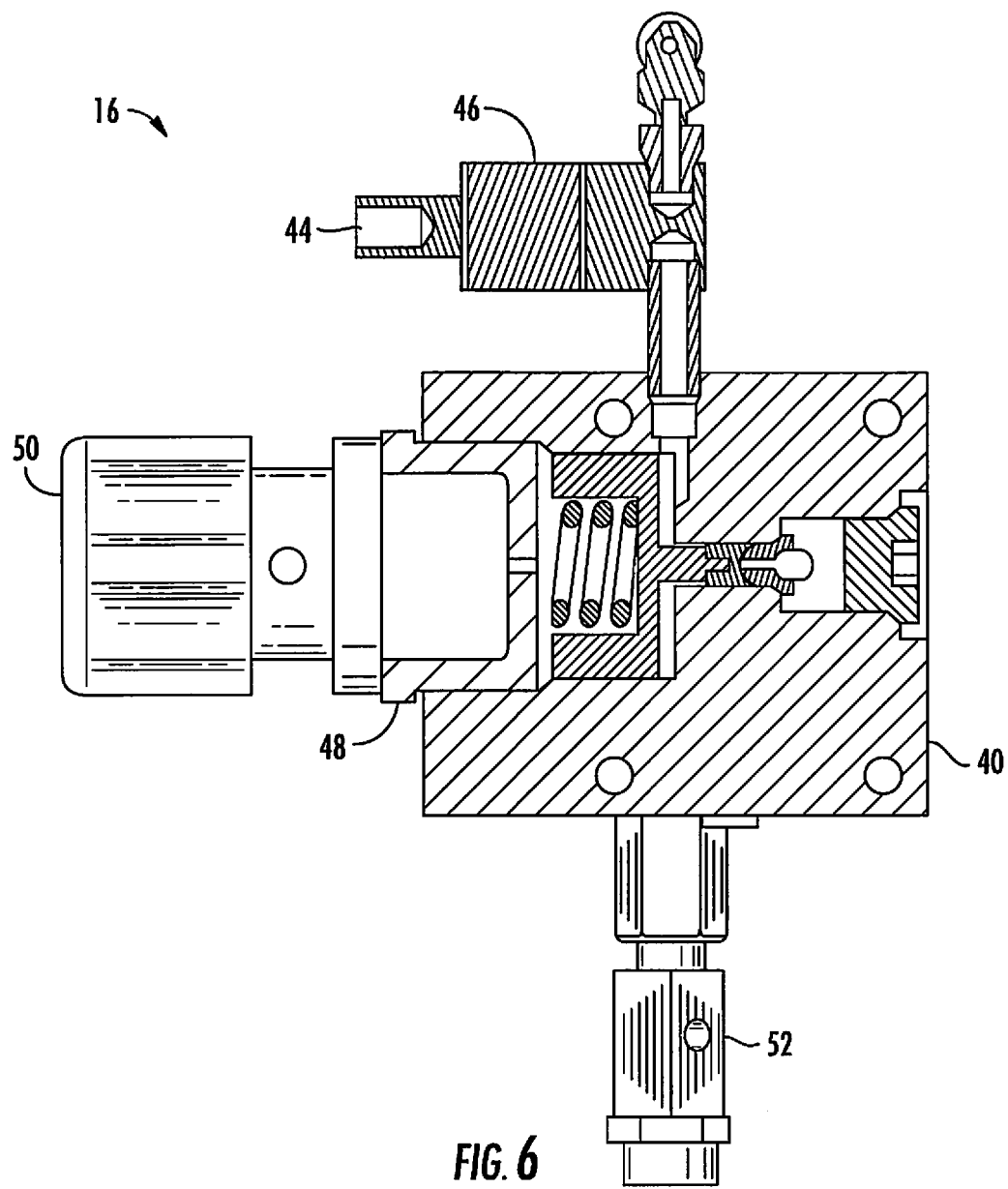
FIG. 6 illustrates a cross-sectional view of a pressure control manifold through line B-B of FIG. 4, according to an embodiment of the present disclosure.
Figure 7:
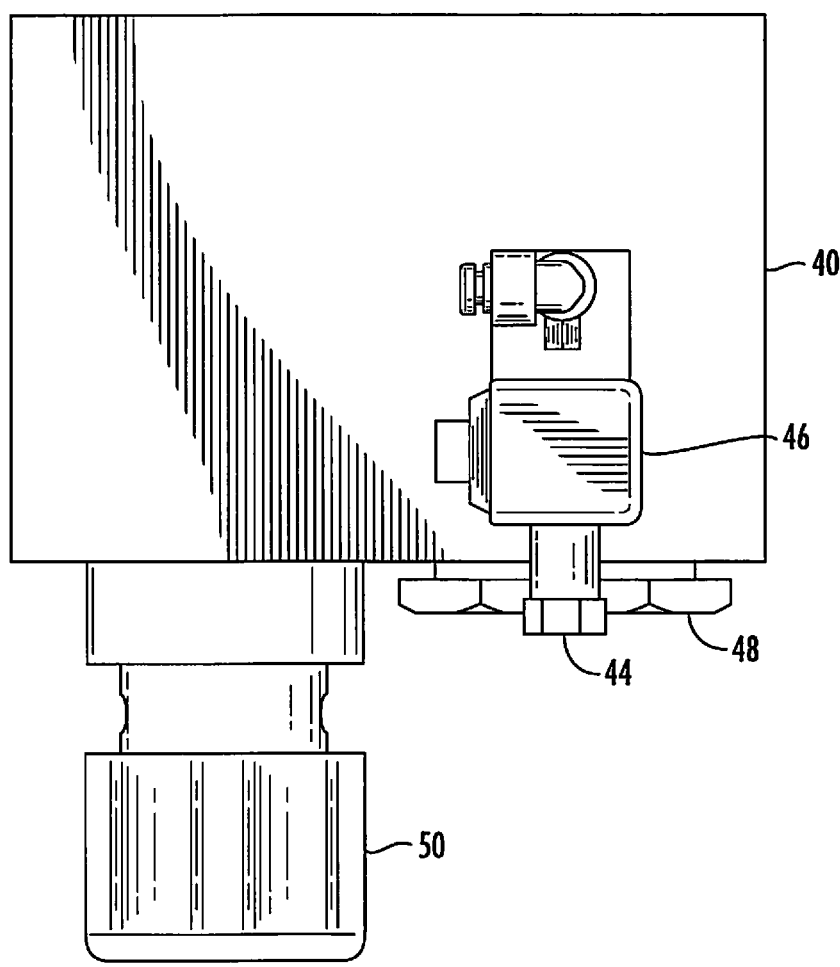
FIG. 7 illustrates a view of a pressure control manifold from line E-E of FIG. 4, according to an embodiment of the present disclosure.
Figure 8:
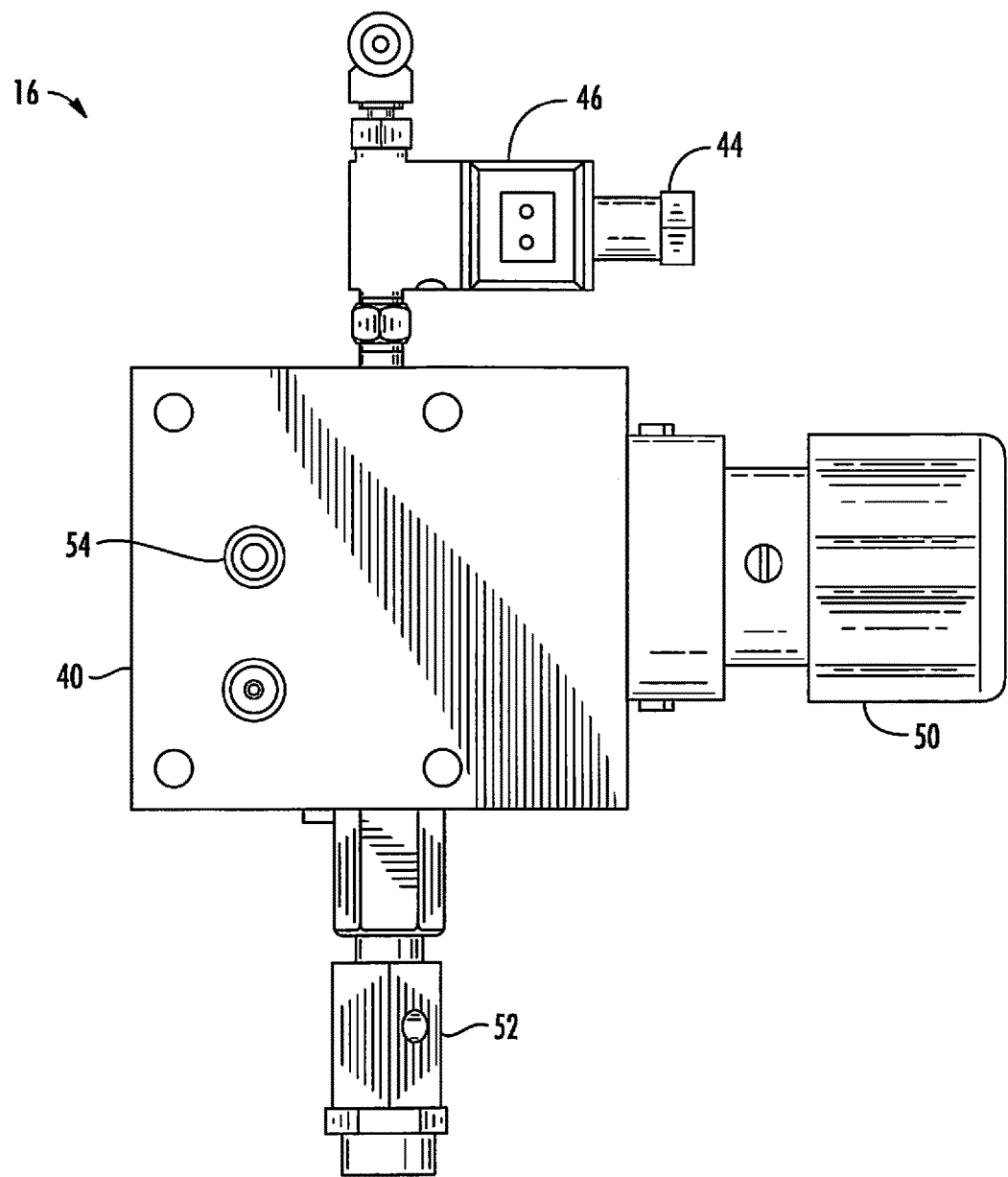
FIG. 8 illustrates a view of a pressure control manifold from line C-C of FIG. 4, according to an embodiment of the present disclosure.
Figure 9:
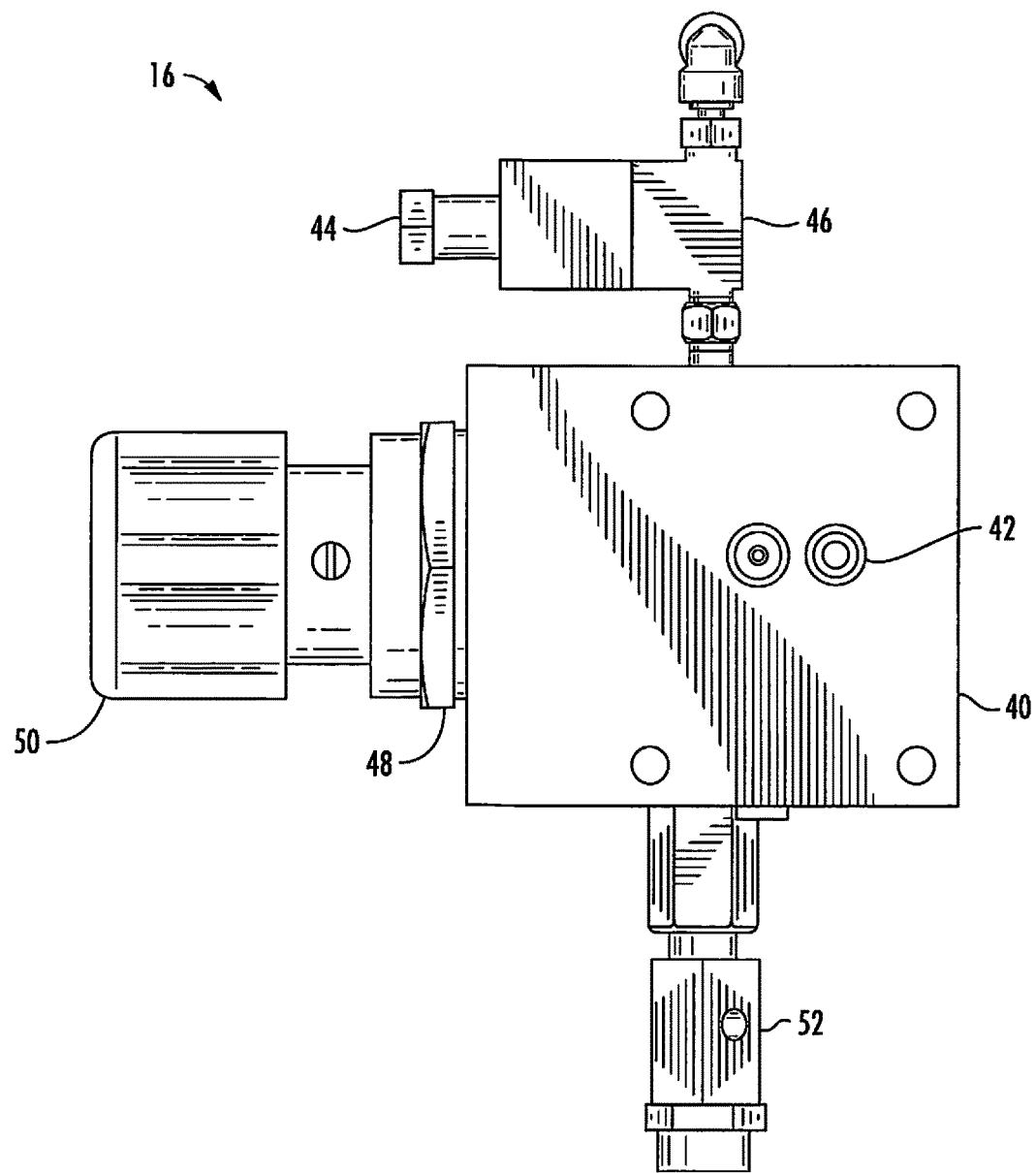
FIG. 9 illustrates a view of a pressure control manifold from line D-D of FIG. 4, according to an embodiment of the present disclosure.
Figure 10:
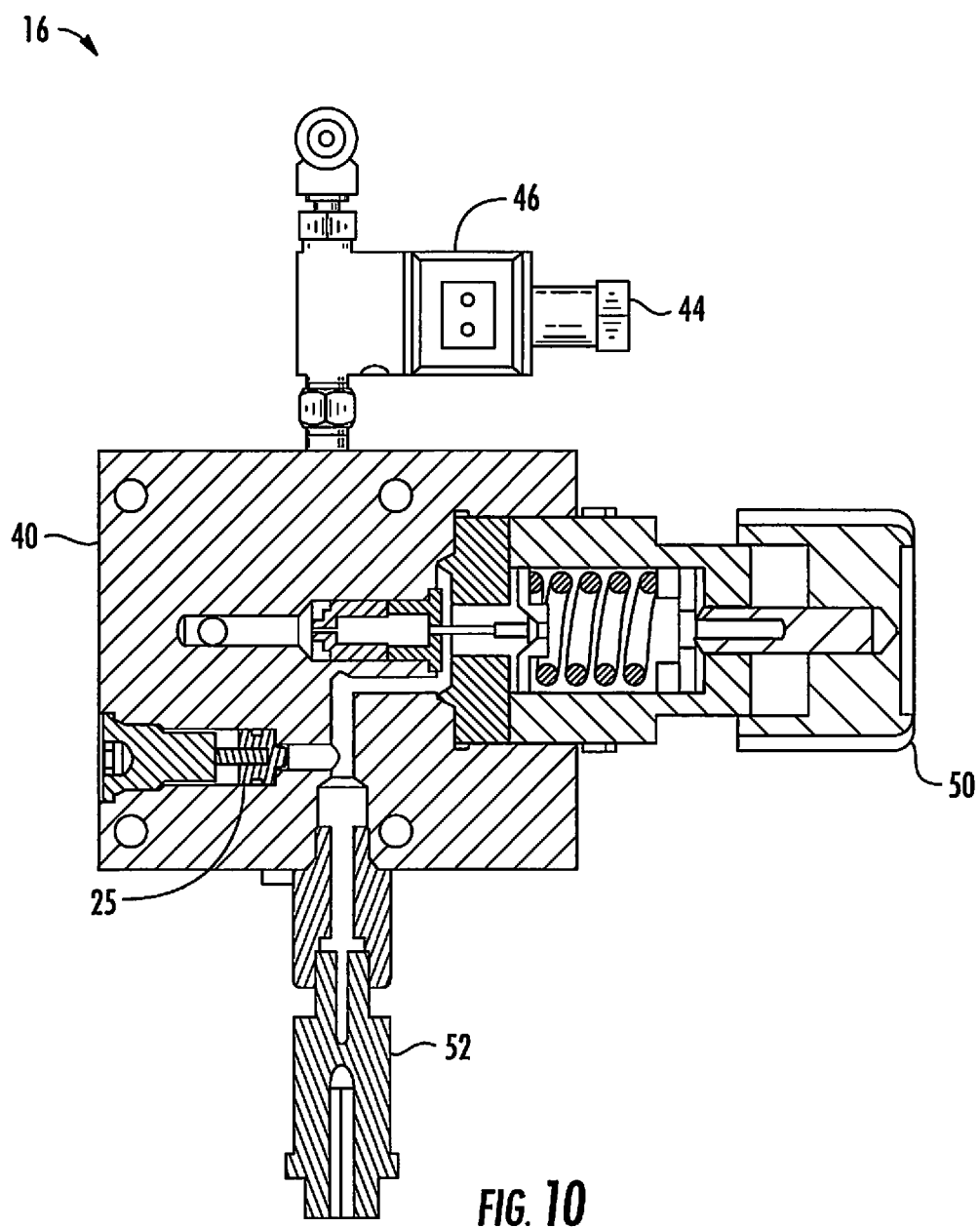
FIG. 10 illustrates a cross-sectional view of a pressure control manifold through line G-G of FIG. 4, according to an embodiment of the present disclosure.

FIG. 4 illustrates a top plan view of the pressure control manifold 16, according to an embodiment of the present disclosure. FIG. 5 illustrates a cross-sectional view of the pressure control manifold 16 through line A-A of FIG. 4, according to an embodiment of the present disclosure. FIG. 6 illustrates a cross-sectional view of the pressure control manifold 16 through line B-B of FIG. 4, according to an embodiment of the present disclosure. FIG. 7 illustrates a view of the pressure control manifold 16 from line E-E of FIG. 4, according to an embodiment of the present disclosure. FIG. 8 illustrates a view of the pressure control manifold 16 from line C-C of FIG. 4, according to an embodiment of the present disclosure. FIG. 9 illustrates a view of the pressure control manifold 16 from line D-D of FIG. 4, according to an embodiment of the present disclosure. FIG. 10 illustrates a cross-sectional view of the pressure control manifold 16 through line G-G of FIG. 4, according to an embodiment of the present disclosure.

Figure 11:
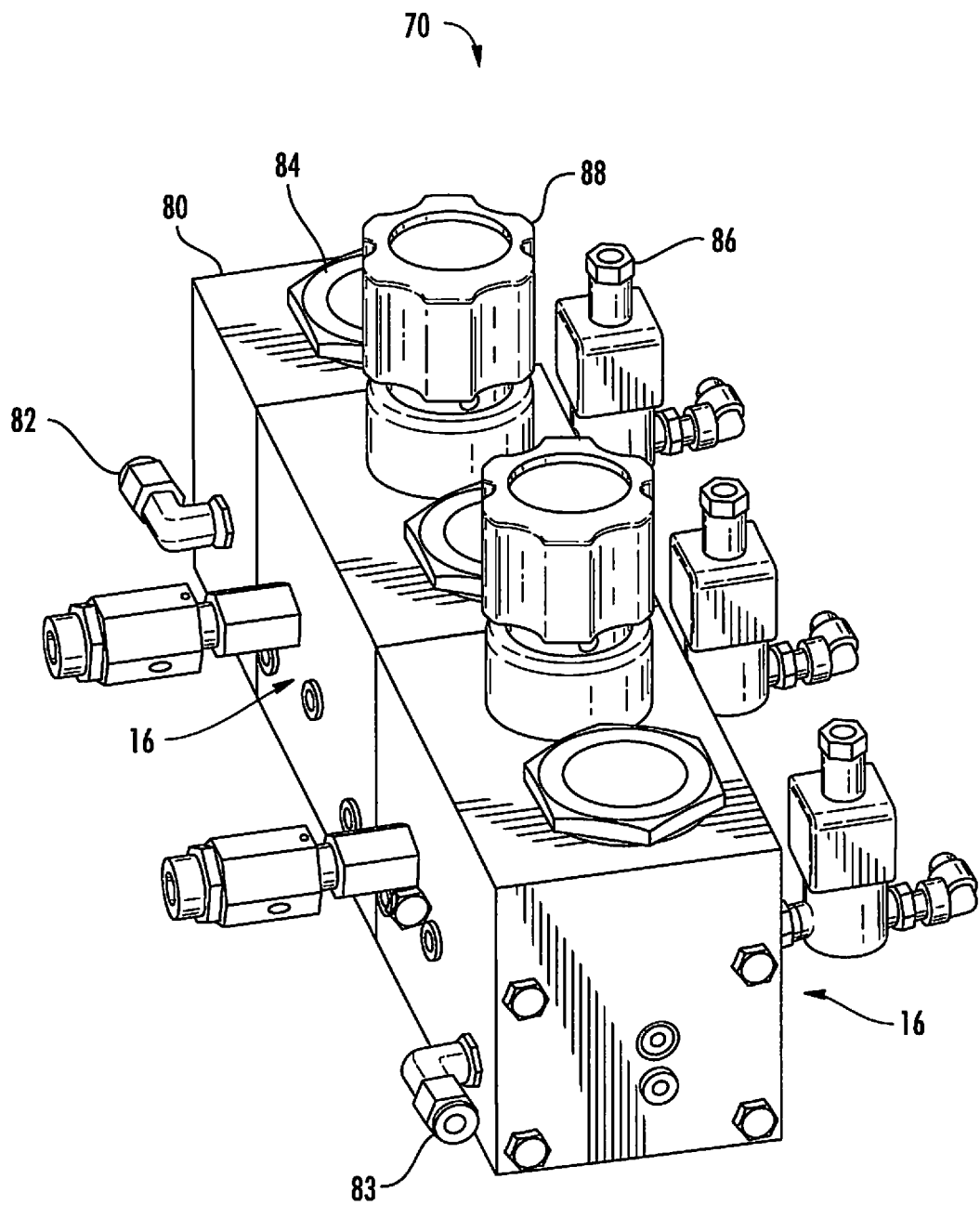
FIG. 11 illustrates a perspective top view of a modular pressure control assembly, according to an embodiment of the present disclosure.
Figure 12:
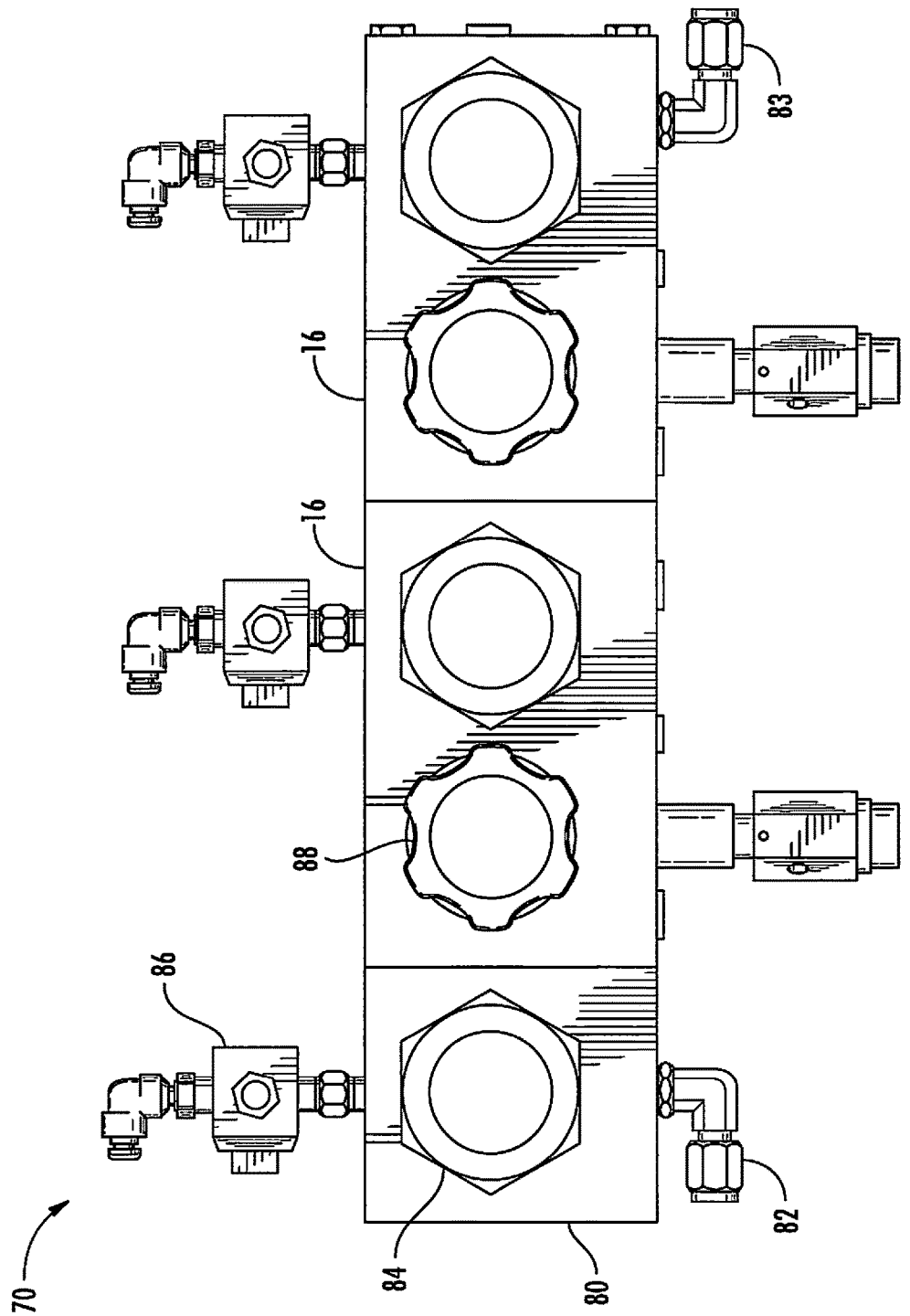
FIG. 12 illustrates a top view of a modular pressure control assembly, according to an embodiment of the present disclosure.

FIG. 11 illustrates a perspective top view of a modular pressure control assembly 70, according to an embodiment of the present disclosure. FIG. 12 illustrates a top view of the modular pressure control assembly 70. Referring to FIGS. 11 and 12, multiple pressure control manifolds 16 may be connected together to provide fluid filling to different pressures. As shown in FIGS. 11 and 12, two pressure control manifolds 16 may be connected to an outlet block 80, which may include an air outlet nozzle 82, a pilot operated valve 84, and a solenoid valve 86.

Referring to FIGS. 1-12, embodiments of the present disclosure provide a system, such as the system 10, that provides pneumatic controls in the form of modular manifold blocks, such as the pressure control manifolds 16, which allow electronic/electrical selection of preset breathing air cylinder fill pressures to support an automated breathing air cylinder charge station. The advantages of a fully automatic charge station include: less labor, consistent cylinder filling practices, removal of operator error, and lower skill level required by the operator.

In order to achieve an automatic charge station, the control unit 30 may be configured to select the correct fill pressure for a given breathing air cylinder type. For example, the control unit 30 may be configured to determine the type of fluid cylinder connected to the system 10, and operate the pressure control manifolds 16 (such as by opening or closing air paths therein) to fill the fluid cylinder to a proper pressure. For example, the control unit 30 may determine the proper fluid fill pressure of a fluid cylinder through RFID identification, serial number identification, connection interfaces, and/or the like. Additionally, the system 10 may include redundant safety features that prevent incorrect filling of breathing air cylinders should one or more parts of the system fail to operate correctly.

The system 10 provides a modular design that includes manifold blocks, such the pressure control manifolds 16, each of which may include components configured for specific functions. The system 10 may be scalable in that the pressure control manifolds 16 may be stacked to create support for automatic pressure selection from two pressures, four pressures, or even more, depending on the needs of an end user. A flow control manifold module (shut-off), such as the outlet block 80, may be positioned at the end of the stack.

Each of the pressure control manifolds 16 may be identical, thereby creating economies of scale and simplifying service support. The plumbing for the system 10 may use a single high pressure line in from the main control manifold and one high pressure line out to the charge station, thereby making it simple to add the system 10 onto an existing system and reducing the chance for potential leaks. The design has several protections against single point failures causing the inadvertent over- or under-filling of breathing air cylinders due to a mechanical failure.

The system 16 may include a compressor, storage cylinders, a charge station, a pneumatic control panel, and an electronic controller. It is often the case that the end user of such a system may desire to fill a variety of breathing air cylinders with differing pressure ratings. For example, pressure ratings can include 2216 psi, 3000 psi, 4500 psi, and 5500 psi.

The system 10 may include a series of preset pressure regulators in series with pilot operated valves that are controlled by corresponding 3-way solenoid valves. The circuit is arranged such that each subsequent regulator in the series is set at a lower pressure than a preceding regulator and each regulator may be paired with a pressure relief valve set to an appropriate pressure. Unless one of the pilot operated valves has been opened by the activation of a corresponding solenoid valve, the default pressure supplied to the breathing air cylinders being filled is that of the last pressure regulator in the series (lowest pressure), thereby creating a "fail safe" condition against over pressurization.

As shown in FIG. 1, for example, solenoid valves 20, 20', 20" may be energized in order to deliver 5500 psi. Solenoid valves 20' and 20" may be energized in order to deliver 4500 psi. Solenoid valve 20" may be energized in order deliver 3000 psi. If no solenoid valves are energized, the default pressure may be 2216 psi. Each pressure regulator and corresponding relief valve 24, 24', 24" may be isolated from the rest of the circuit by a downstream check valve that prevents a higher pressure from opening the relief valve when the pressure regulator is not being used.

As shown in FIG. 1, the pilot operated valve 84 may be used to control the flow of air into the charge station. The pilot operated valve 84 may not allow air into the charge station unless the controller, such as the control unit 30, senses that all of the required safety conditions have been met. Such safety conditions may include the charge station door being closed and locked, and cylinders with compatible pressure ratings have been inserted. The pilot operated valve 84 may also be used as a redundant pressure control to the pressure regulator by responding to inputs from a pressure sensor that reads the breathing air cylinder pressure and shuts off at an appropriate pressure.

The pilot operated valves may respond to low pressure air from a circuit in the system that may be used to sense the condition of gases supplied as breathing air. The air pressure in such a circuit may be 150 psi. The pilot valves may be held closed against the high pressure air in the system by a stiff spring, for example.

The 3-way solenoid valve 20 vents the activation chamber in the valve to atmosphere when the solenoid valve 20 is not energized, thereby preventing any leakage of high pressure air from inadvertently opening the valve. Because not all end users need four different pressures, the system 10 is configured to be built up from individual manifold blocks or pressure control manifolds 16 (modules) that may be stacked together to achieve the desired number of controlled pressures. FIGS. 2-10 show and describe features of such a module. Each module may include an adjustable pressure regulator 50, a pilot operated valve 48, a check valve 25, and a relief valve 52. Each module may also include four clamping bolt holes, an air inlet 83, and an outlet port 54. FIGS. 12 and 13 show two such modules assembled together with a flow control module to create a three pressure system.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A cylinder filling system configured to automatically fill a fluid cylinder, the fluid cylinder having a pressure rating, the cylinder filling system comprising:
   a plurality of pressure control manifolds operatively connected together and disposed in a fluid circuit between a fluid storage container and a fluid outlet, each of the plurality of pressure control manifolds delivering fluid to each of the plurality of fluid cylinders at a preset breathing air cylinder fill pressure corresponding to the pressure rating of the fluid cylinder; and
   a control unit in communication with the plurality of pressure control manifolds, the control unit being configured to operate the plurality of pressure control manifolds to deliver fluid at the preset breathing air cylinder fill pressure of the fluid cylinder that connects to the fluid outlet.

2. The cylinder filling system of claim 1, wherein the control unit is configured to recognize the fluid cylinder connected to the fluid outlet and the pressure rating of the fluid cylinder, and to operate the plurality of pressure control manifolds to deliver fluid at the pressure rating of the fluid cylinder.

3. The cylinder filling system of claim 1, wherein each of the plurality of pressure control manifolds includes a solenoid valve in operative communication with the control unit.

4. The cylinder filling system of claim 1, wherein each of the plurality of pressure control manifolds includes a pilot operated valve.

5. The cylinder filling system of claim 1, wherein each of the plurality of pressure control manifolds includes a pressure regulator.

6. The cylinder filling system of claim 1, wherein each of the plurality of pressure control manifolds includes a pressure relief valve.

7. The cylinder filling system of claim 1, wherein each of the plurality of pressure control manifolds is an identical module attachable to an adjacent module to add an additional selectable preset breathing air cylinder fill pressure.

8. The cylinder filling system of claim 3, wherein each of the plurality of pressure control manifolds includes a pressure regulator with a corresponding solenoid valve, each pressure regulator having a pressure, the pressure regulators being arranged in a series such that each subsequent pressure regulator in the series is set at a lower pressure than a preceding regulator, a delivery pressure to the cylinder being filled defaults to the lowest pressure when none of the solenoid valves has been activated.

9. The cylinder filling system of claim 8, wherein a pilot operated valve is located immediately after the last pressure regulator in the series, the pilot valve controlling the flow of fluid into the cylinders to be filled.

10. The cylinder filling system of claim 9, wherein the pilot operated valve allows fluid to pass to fill cylinders when one or more measured system requirements have been met.

11. The cylinder filling system of claim 9, wherein the pilot operated valve used in conjunction with the control unit as a redundant pressure control to the pressure regulators, the pilot valve shutting off the flow of fluid after the correct fluid pressure has been achieved.

12. The cylinder filling system of claim 1, wherein the rated fluid pressure of a fluid cylinder is selected from the group consisting of 2216 psi, 3000 psi, 4500 psi, and 5500 psi.

13. A cylinder filling system comprising:
- a plurality of pressure control manifolds, each of the plurality of pressure control manifolds providing fluid at a different cylinder fill pressure, the plurality of pressure control manifolds being operatively connected to each other in series, each of the plurality of pressure control manifolds having a solenoid valve;
- an outlet block operatively coupled to and being downstream of the plurality of the pressure control manifolds; and
- a control unit in communication with the plurality of pressure control manifolds, the control unit automatically and selectively activating one or more of the plurality of solenoid valves.

14. The cylinder filling system of claim 13, wherein the plurality of pressure control manifolds includes at least a first pressure control manifold and a second pressure control manifold downstream of the first pressure control manifold.

15. The cylinder filling system of claim 14, wherein the first pressure control manifold includes an air inlet and the outlet block includes an air outlet nozzle couplable to a fluid cylinder.

16. The cylinder filling system of claim 15, wherein the control unit is programmed to selectively activate one or more of the plurality of solenoid valves based on a fluid cylinder being coupled to the air outlet nozzle.

17. The cylinder filling system of claim 16, wherein the control unit is programmed to recognize a refill pressure rating of the fluid cylinder being coupled to the air outlet nozzle based on at least one of RFID, serial number, and connection interface.

18. The cylinder filling system of claim 17, wherein the control unit is programmed to energize at least one solenoid valve based on the refill pressure rating of the recognized fluid cylinder.

19. The cylinder filling system of claim 15, wherein the first pressure control manifold is preset to a first cylinder fill pressure, the second pressure control manifold is preset to a second cylinder fill pressure, and the outlet block is preset to a third cylinder fill pressure, the third cylinder fill pressure being less than the first and second cylinder fill pressures.

20. A cylinder refilling system comprising:
- a plurality of pressure control manifolds in fluid communication with each other and connected in series, each of the plurality of pressure control manifolds including:
  - a solenoid valve;
  - a pilot operated valve controlled by the solenoid valve;
  - a check valve;
  - a pressure relief valve; and
  - a fluid flow path,
- the solenoid valve of each of the plurality of pressure control manifolds allowing fluid to flow through the fluid flow path at a different preset pressure.

* * * * *